July 13, 1943.  E. R. WILSON  2,324,183
PRISONER'S HARNESS
Filed Jan. 15, 1942   2 Sheets-Sheet 1

Inventor
Earl R. Wilson,
By Barry & Cyr
Attorneys

July 13, 1943.     E. R. WILSON     2,324,183
PRISONER'S HARNESS
Filed Jan. 15, 1942     2 Sheets-Sheet 2
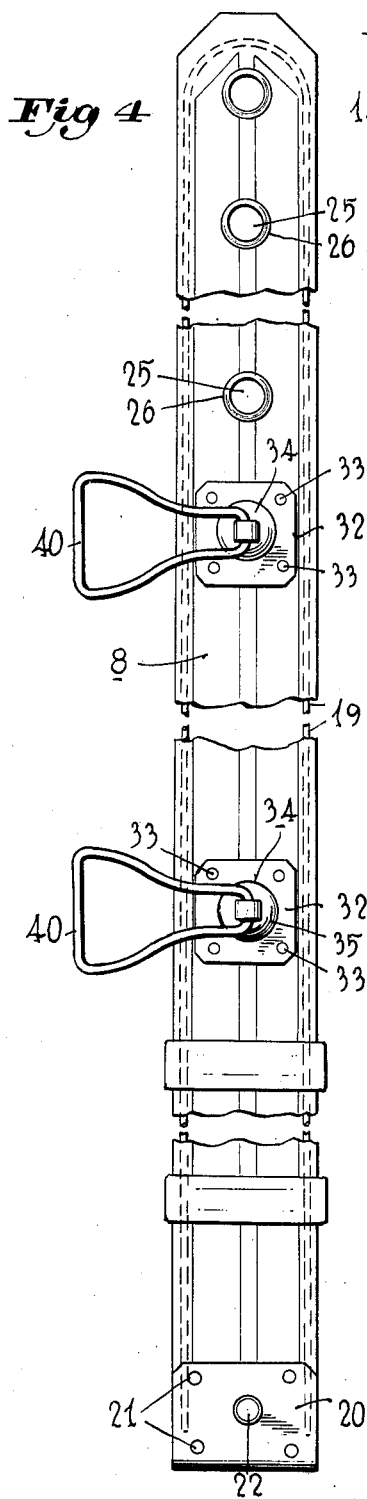
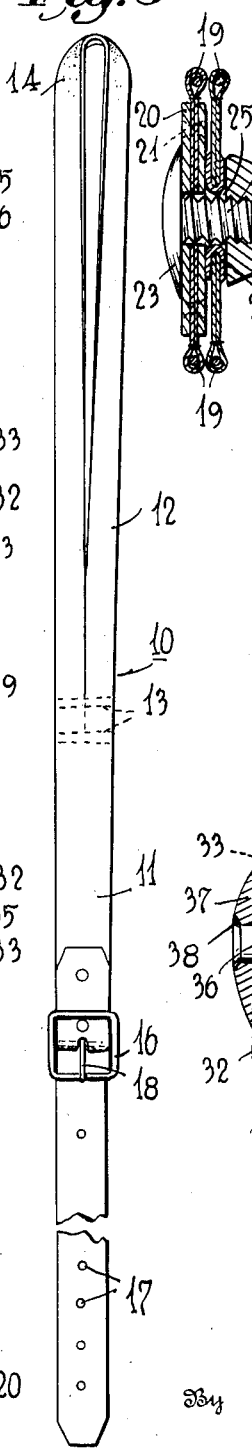
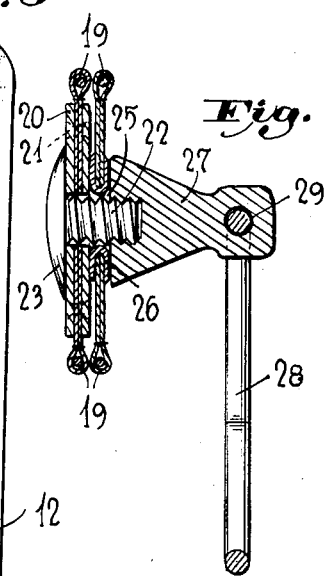
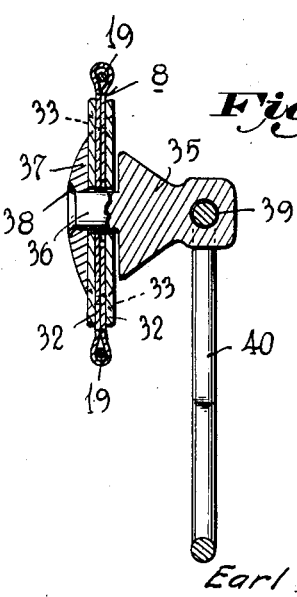
Inventor
Earl R. Wilson,
By Barry & Cyr
Attorneys Patented July 13, 1943

2,324,183

UNITED STATES PATENT OFFICE 2,324,183

PRISONER'S HARNESS

Earl R. Wilson, Montgomery, Ala., assignor of thirty-five one-hundredths to Luther L. Jones Application January 15, 1942, Serial No. 426,931

10 Claims. (Cl. 70—16)

This invention relates to prisoners' harness, and more particularly to a novel harness especially useful in safely transferring one or more prisoners from one place to another.

An object of the invention is to provide a harness including a belt for the prisoner having a securing means adapted to cooperate with handcuffs, whereby the belt cannot be removed so long as the handcuffs are closed.

Another object is to provide prisoner's harness including a neck strap which may be adjustably connected to the belt so that the prisoner may be restrained from bending forward where necessary.

A further object is to supply a prisoner's harness comprising auxiliary loop members having swivel connection with the belt to allow one or more additional prisoners to be secured to the harness of the one wearing the latter.

Another object is to furnish a harness comprising a belt reinforced internally with metal wire or the like to prevent the same from being cut from the prisoner.

A further object of the invention is to produce a simple and relatively inexpensive harness, and yet one which will be exceedingly effective for the purpose for which it is designed.

With the foregoing and other objects in view which will appear as the description proceeds, the invention consists in the novel features hereinafter described in detail, illustrated in the accompanying drawings, and more particularly pointed out in the appended claims.

In the drawings:

Fig. 4 is an enlarged external elevation of the belt in extended position.

Fig. 5 is an elevation of the neck strap.

Fig. 6 is an enlarged vertical sectional view of the means employed to secure the end portions of the belt together, and taken on the line 6—6 of Fig. 3.

Fig. 7 is a similar view of an auxiliary swivel connection used in fastening other prisoners to the one wearing the harness, and taken on the line 7—7 of Fig. 3.

Figure 1:
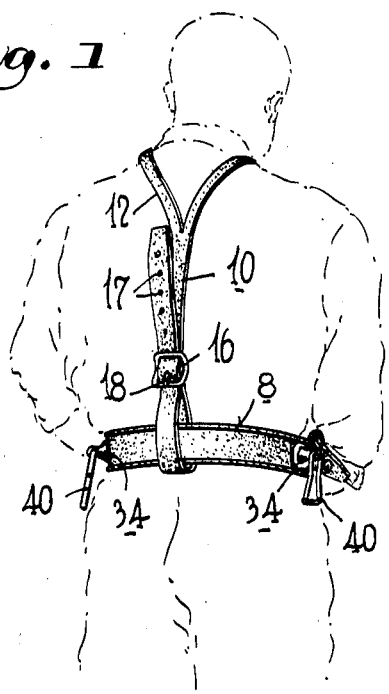
Fig. 1 is a rear view in dotted lines, of a prisoner wearing my harness, which is shown in full lines.
Figure 2:
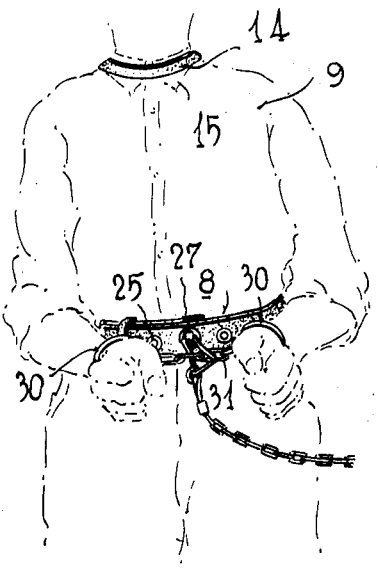
Fig. 2 is a similar view, looking at the front of the prisoner.
Figure 3:
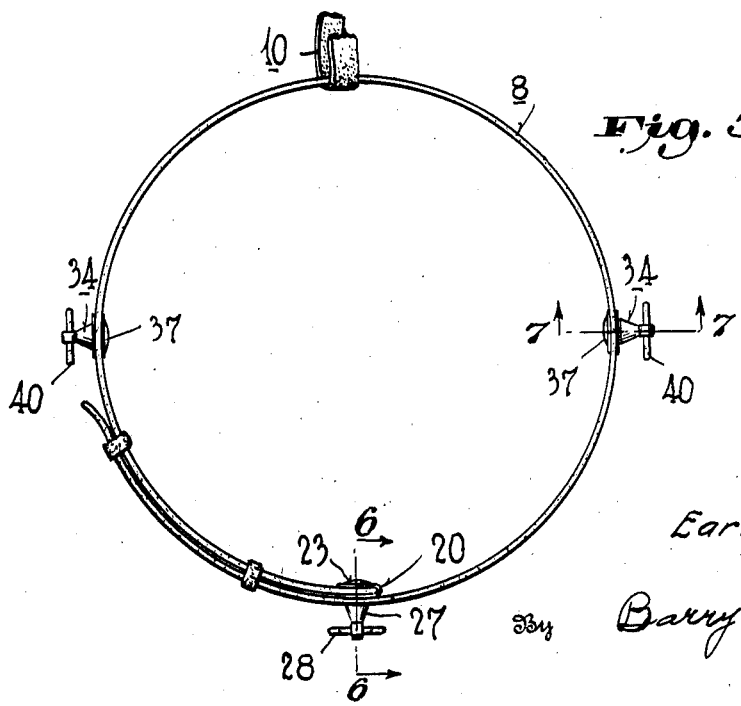
Fig. 3 is a plan view of the belt of the harness.

Referring to the drawings in detail, and as best shown in Figs. 1 and 2, a belt 8 which is adapted to pass around the waist of a prisoner 9 and to be securely fastened to the latter, is provided with an adjustable neck strap 10. The strap, as best shown in Fig. 5, consists of a main portion or strand 11 secured at one end to a yoke strap 12. The ends of the latter are arranged side by side and are stitched to the ends of the strand 11 by stitches 13. Due to this construction, the front portion 14 (Fig. 2) of the yoke will conform to the neck of the prisoner and may be even concealed to some extent beneath the collar 15 of his shirt, which, to a degree, would relieve the prisoner from embarrassment when being transported on a train or the like.

A buckle 16 is secured to the strand 11 intermediate the ends thereof, and such strand has a series of holes 17 to receive the prong 18 of the buckle, after a portion of the strand has been looped about the back of the belt, as indicated in Fig. 1. Obviously, the adjustment of the strap will permit the prisoner to bend forward more or less, and at the same time, will prevent him from removing the belt by moving the latter down over his hips.

The belt is of rugged construction, and is preferably formed of longitudinally folded and stitched leather, the marginal edges being reinforced by one or more pieces of flexible wire 19 or the like.

One end of the strap is reinforced by a folded or U-shaped metal member 20, preferably riveted to the leather, as indicated at 21, and into which the ends of the wire extend.

A relatively thick threaded shank 22 extends through the reinforced end of the belt and projects beyond one face thereof, as indicated in Fig. 6. The shank is preferably rigidly secured in place and has an enlarged head 23 positioned at the inner side of the belt. The shank is designed to cooperate or extend through any one of a number of holes 25 arranged in spaced relation along a portion of the strap and preferably reinforced by metal ferrules or eyelets 26. When the belt is placed about the waist of a prisoner, the shank will project forward from the prisoner's body and it may be passed through a proper one of the holes 25. Then, a cone-shaped nut 27 is screw on the shank to provide a secure fastening. An eye or loop 28 is pivotally connected to the nut, as shown at 29, and the eye is of such size as to permit the jaws of an open handcuff 30 to be passed therethrough in securing the harness to a prisoner. For example, after one cuff 30 has been secured to one wrist of the prisoner, the open jaws of the opposite cuff may be passed through the loop 28 and then secured to the prisoner's other wrist.

The use of this harness will enable law enforcement authorities to safely transport prisoners from one point to another with comfort. The use of the harness should enable officers to transport prisoners at a minimum of expense, while affording maximum insurance against escape or delivery of the prisoner by friends or former associates, with the added consideration of permitting the prisoner a comfortable trip.

When the prisoner has been secured by the harness, he cannot, under any conditions, extricate himself, but must sit or stand with his hands securely locked in front of him, with the possibility of moving them confined to a few inches in any direction. Thus shackled, he is unable to lift his hands from the vicinity of his lap higher than the limits permitted by the length of the handcuff chain 31, nor may he move his hands to the right or left more than about six inches. He may, however, bend forward to light a cigar or a cigarette, to eat a sandwich, candy, etc., but drinking, while possible, will be difficult. In addition, he may lie down or shift his position at will, as the belt does not interfere with the action of the lower portion of his body. If the officer has reason to believe that his prisoner is particularly dangerous, the adjusting of the neck strap will prevent even the aforementioned slight movements. If such strap is tightened while the prisoner is standing or sitting erect, he must remain in that position until the adjustment is changed.

As heretofore mentioned, the harness may be employed in transporting more than one prisoner. For this purpose, the belt is provided at one or more points with pairs of metal plates 32 arranged at opposite sides thereof and secured in position by rivets 33 or the like. Where each pair of plates is located, a swivel connection 34 is provided. It may consist of an outer cone-shaped member 35 having a shank 36 which extends through and is rotatable in the belt. An inner head 37, rotatable with the shank, is secured thereto by upsetting the end of the shank, as indicated at 38. The outer portion 35 of the swivel is pivotally connected at 39 to a loop or eye 40.

One, or two additional prisoners may be transported by passing a ten inch medium size chain (not shown) with a two inch steel ring attached to each end, through the eye 40, and by then slipping the ring on one end of the chain over the jaws of the cuff for the prisoner's right hand before attaching and locking the cuff, and the ring on the other end of the chain over the cuff for his left hand, before attaching and locking the last mentioned cuff, the second prisoner may be readily secured to the first one. Secured in such manner, the hands of the prisoner being transported on the auxiliary attachment will have a play of some five inches forward and inward toward the prisoner wearing the harness.

Obviously, the prisoner wearing the harness can be secured to the officer by any suitable means such as a chain attached to any one of the eyes 28, 40.

From the foregoing it is believed that the construction, use and advantages of the invention may be readily understood, and it is apparent that changes may be made in the details disclosed, without departing from the spirit of the invention, as expressed in the following claims.

What I claim and desire to secure by Letters Patent is:

1. Prisoners' harness comprising a waist belt, a neck yoke, a strap having one of its ends secured to the back of the neck yoke, said strap encircling the back of the belt and having means to adjust the length of the strap for limiting movement of the neck yoke toward and away from the belt, the front of the waist belt and the front of the neck yoke being free to move away from one another without restraint.

2. Prisoners' harness comprising a waist belt, a yoke member consisting of a flat strap shaped to conform with the front of the neck of a person and having parallel ends adapted to be arranged at the back of such person, a back strap having one of its ends secured to the ends of the yoke strap, a buckle secured to the medial portion of the back strap, said back strap being looped about the rear of the belt and passed through said buckle, the portion which is passed through the buckle being provided with apertures to cooperate with the buckle in adjustably securing the back strap to the belt.

3. Prisoners' harness comprising a waist belt having a threaded shank projecting outwardly therefrom and extending through a hole in an overlapped portion of the belt, a nut engaging said shank and securing the overlapped portions of the belt together, and an eye connected to the nut and of a size to permit the jaws of an open handcuff to be passed therethrough but of insufficient size to permit a closed handcuff to be passed therethrough.

4. Prisoners' harness comprising a waist belt having a threaded shank projecting outwardly therefrom and extending through a hole in an overlapped portion of the belt, a nut engaging said shank and securing the overlapped portions of the belt together, and an eye connected to the nut and of a size to permit the jaws of an open handcuff to be passed therethrough, but of insufficient size to permit a closed handcuff to be passed therethrough, said eye being pivotally connected to the nut for movement about an axis arranged perpendicularly to the axis of the threaded shank.

5. Prisoners' harness including a waist belt having inner and outer overlapped end portions, a metal mounting member fixedly secured to the inner end portion and provided with a forwardly projecting threaded shank, the outer end portion of the belt having an aperture through which the shank extends, a nut having threaded connection with the shank, and an eye pivotally connected to the nut for swinging movement about an axis perpendicular to the shank.

6. Prisoners' harness including a waist belt having inner and outer overlapped end portions, a metal mounting member fixedly secured to the inner end portion and provided with a forwardly projecting threaded shank, the outer end portion of the belt having an aperture through which the shank extends, a nut having threaded connection with the shank, and an eye pivotally connected to the nut for swinging movement about an axis perpendicular to the shank, said eye being of a size to permit the open jaws of a handcuff to be passed therethrough, but of insufficient size to permit a closed handcuff to be passed therethrough.

7. Prisoners' harness comprising a belt formed of folded fabric having folded portions extending along the longitudinal edges thereof, a wire cable having longitudinal strands enclosed within the folded edge portions of the belt and terminating near one end of the latter, a U-shaped metal terminal into which the latter end of the belt extends, means rigidly securing said U-shaped member to the belt, and means connected to the U-shaped member and securing overlapped end portions of the belt together.

8. A prisoner's harness belt formed of longitudinally folded leather and having metallic reinforcing means arranged within folded edge portions thereof, inner and outer metal plates riveted to the belt at opposite sides thereof and positioned between said reinforcements, a swivel member connected to said plates, and an eye connected to the swivel member.

9. A prisoner's harness belt formed of longitudinally folded leather and having metallic reinforcing means arranged within folded edge portions thereof, inner and outer metal plates riveted to the belt at opposite sides thereof and positioned between said reinforcements, a swivel member connected to said plates, and an eye connected to the swivel member, said eye being pivotally connected to the swivel member for swinging movement about an axis arranged perpendicular to the axis of the swivel member.

10. Prisoners' harness comprising a belt adapted to encircle the waist of a prisoner and having overlapping inner and outer end portions, a threaded shank secured to the inner end portion and projecting outwardly through a hole in the outer end portion, a nut in threaded engagement with the shank and cooperating with the latter to clamp the end portions of the belt together, an eye pivotally connected to the nut for movement about an axis arranged perpendicularly to the axis of the shank, said eye being of a size to allow open jaws of handcuffs to be passed therethrough, a neck yoke, and a back strap adjustably connecting the neck yoke to the belt at a point substantially diametrically opposite to that where the threaded shank is arranged.

EARL R. WILSON.